June 13, 1961 G. STADE 2,987,953
POSITIONING, ADJUSTING OR MEASURING DEVICE FOR
MACHINES AND FOR MEASURING APPARATUS
Filed July 3, 1956 4 Sheets-Sheet 2
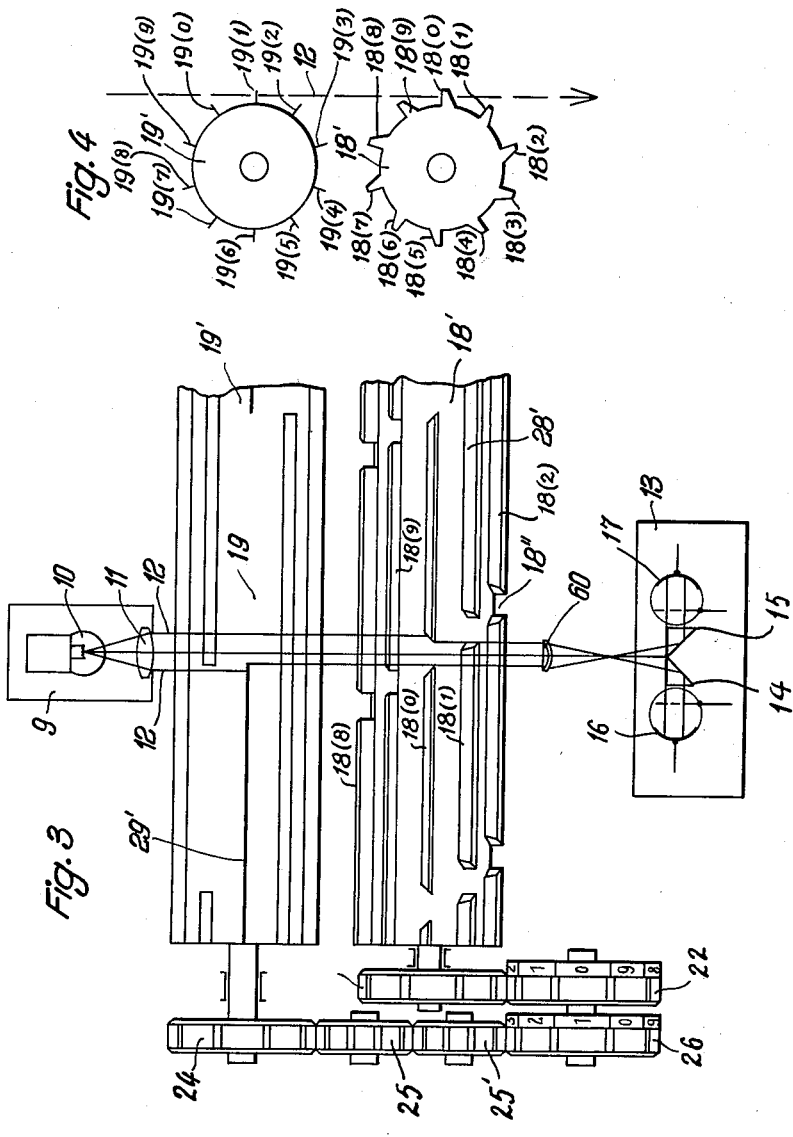
Gerhard Stade
*Inventor:*
ATTORNEY June 13, 1961 G. STADE 2,987,953
POSITIONING, ADJUSTING OR MEASURING DEVICE FOR
MACHINES AND FOR MEASURING APPARATUS
Filed July 3, 1956 4 Sheets-Sheet 3
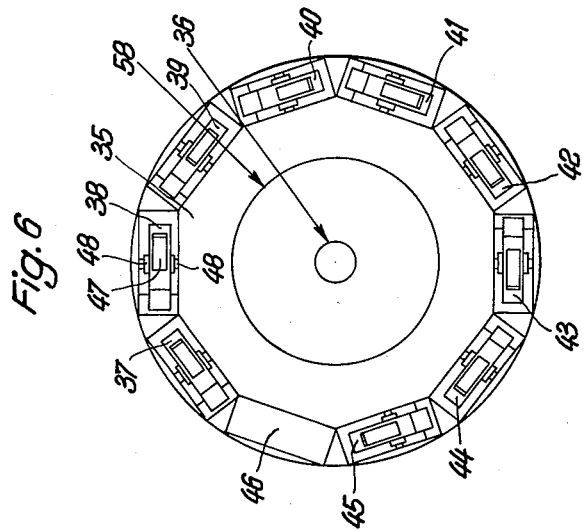
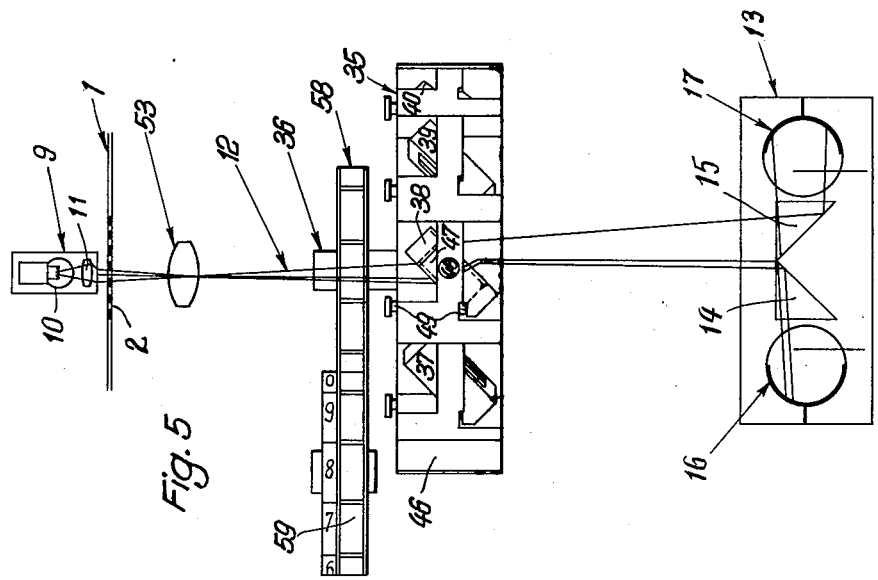
Gerhard Stade
*Inventor:*
ATTORNEY June 13, 1961  G. STADE  2,987,953
POSITIONING, ADJUSTING OR MEASURING DEVICE FOR
MACHINES AND FOR MEASURING APPARATUS
Filed July 3, 1956  4 Sheets-Sheet 4
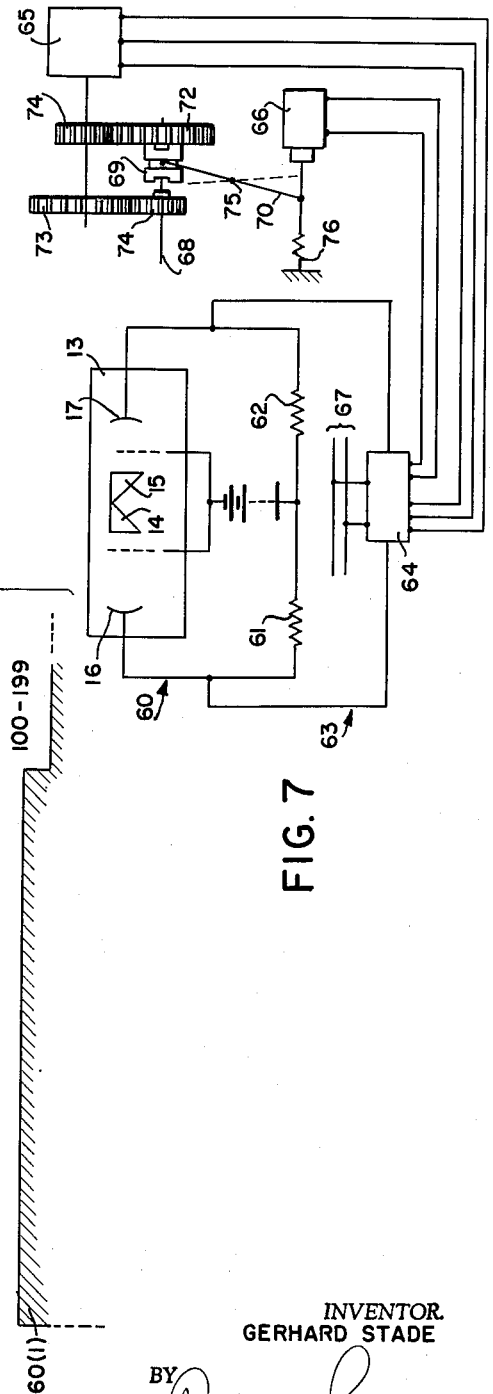
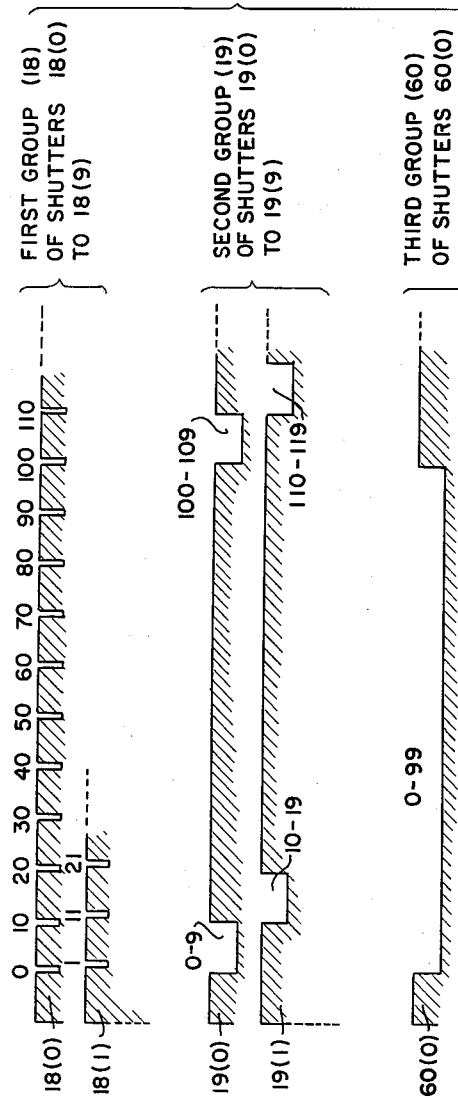
INVENTOR.
GERHARD STADE
BY
ATTORNEY

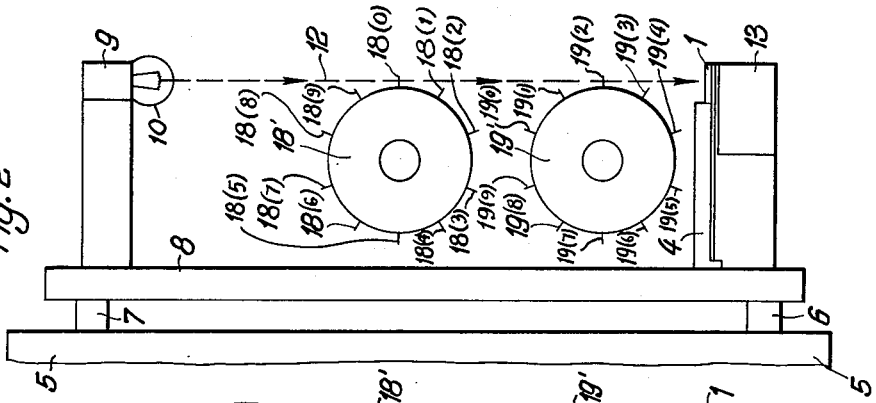
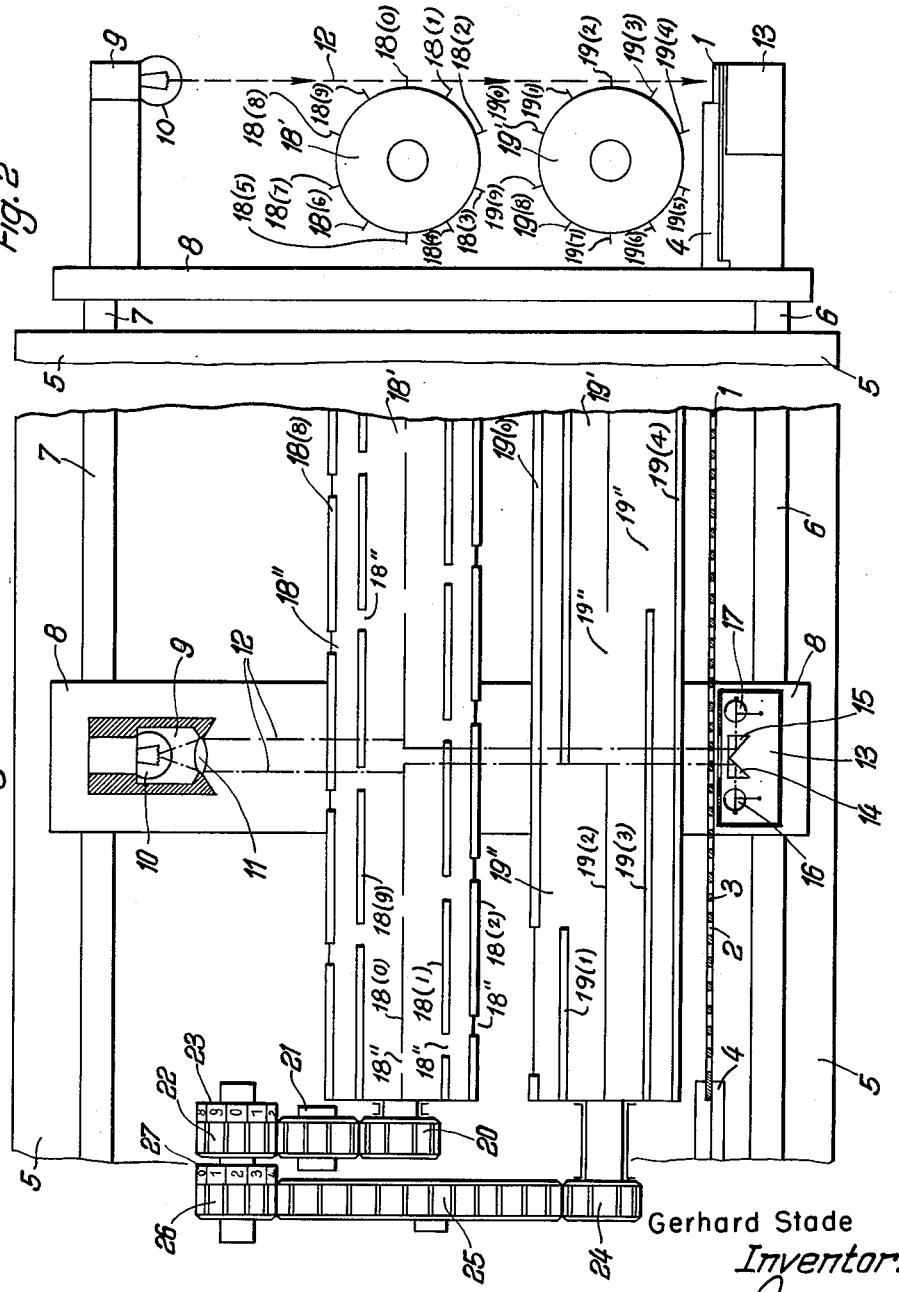

000

United States Patent Office 2,987,953
Patented June 13, 1961

2,987,953
POSITIONING, ADJUSTING, OR MEASURING DEVICE FOR MACHINES AND FOR MEASURING APPARATUS
Gerhard Stade, Frankfurt am Main Sud, Germany, assignor to Herbert Lindner G.m.b.H., Berlin-Wittenau, Germany
Filed July 3, 1956, Ser. No. 595,647
Claims priority, application Germany July 6, 1955
7 Claims. (Cl. 88—14)

My invention relates to a positioning, adjusting or measuring device for machines and for measuring apparatus and more particularly to such devices in which their control mechanism is actuated by optical means. The known devices of that type used a precision scale provided with light permeable graduation slits each of which was controlled by an individually operable shutter; light rays penetrated a predeterminately opened slit and actuated a photoelectrically operated control device which stopped the moving part of the machine or apparatus in accordance with said open slit of the scale.

These known devices could not be used in combination with scales having a small graduation and were intricate in construction and operation.

It is the main object of my invention to avoid the said disadvantages and to provide a device which may be easily adjusted and operated and which will permit an accurate positioning, adjusting or measuring not only in accordance with small graduation units of a precision scale but even in accordance with minute fractions thereof.

The said and other objects of my invention will be more fully understood from the following specification when read with the accompanying drawing in which three embodiments are illustrated. The drawing shows more or less schematically in FIG. 1 a top view of one embodiment of my invention.
FIG. 2 a side view thereof.
FIG. 3 a top view of another embodiment.
FIG. 4 a partial side view thereof.
FIG. 5 a top view of a third embodiment.
FIG. 6 a side view thereof,
FIG. 7 a diagram of a known photoelectric measuring or control device used in my apparatus, and FIG. 8 a schematic illustration of another embodiment of my invention.

The embodiment illustrated in FIGS. 1 and 2 includes a precision scale 1 having graduation marks formed by light permeable slits 2 separated by opaque strips 3. Each slit indicates one measuring unit for example one millimeter of the scale graduation. However scales using other graduation units such as fractions of an inch may be used. The scale 1 is held in the frame 5 of the device or upon the machine with which the device is being used by suitable retaining means 4. The frame 5 includes guiding means such as a pair of bars or rails 6, 7 which are parallel to the longitudinal axis of scale 1 and which support a carriage 8 for sliding displacement. Mounted at opposite ends of said carriage 8 and on opposite sides of scale 1 is, first, an illuminating device 9 which comprises an electric light source 10 and a condenser lens 11 directing a pencil of parallel light rays 12 towards the scale 1, and, second, a photoelectric measuring or control device 13 adapted to respond to said light rays. Said photoelectric measuring or control device 13, well known per se, is for example fully disclosed in my Patent No. 2,871,716 and is again illustrated in FIG. 7. It comprises two optical prisms 14, 15 and two photoelectric cells 16, 17 within a bridge circuit 60 which includes the resistances 61, 62. A bridge balancing circuit 63 contains an indicator 64 (only diagrammatically shown) which comprises as shown and described in my above cited patent vacuum tube amplifiers, relays and switches for control of the reversible electric motor 65 and of the magnet 66 which both receive electric current from the net 67. The motor 65 drives the shaft 68, which actuates the carriage 8 in the manner disclosed in my cited earlier patent over a change speed gear comprising the pinions 71, 72 and 73, 74 and a clutch 69. This clutch 69 is actuated by said magnet 66 over the lever 70 which is turnable on fulcrum 75 and attached to a readjusting spring 76. The clutch 69 when engaging pinion 72 puts the shaft 68 in low gear and thus effects a slow traverse of the carriage 8, and when engaging pinion 74 puts the shaft 68 in high gear thus effecting a quick traverse of carriage 8.

It will be well understood that the carriage 8 will move in one direction or the other in accordance with the direction of rotation of the motor 65. Through a predetermined slit 2 of the scale 1 light rays from the illuminating device 9 will reach one or the other of the prisms 14, 15 and will be directed to one of the photoelectric cells 16 or 17. Accordingly the relays within the indicator 64 will switch off the magnet 66, which up to that time held the clutch 69 in engagement with the pinion 72 thus changing the traverse of the carriage 8 from quick to slow. As soon as the photoelectric cells 16, 17 are equally intensive illuminated the bridge balancing circuit 63 becomes dead and the relay and the switch within the indicator 64 cut off the motor 65 thus arresting the carriage 8 in the desired predetermined position.

The predetermination of the desired graduation slit 2 is effected in accordance with my invention by two or more groups of screens or shutters provided with ports or passageways which in different combinations permit the light rays 12 to penetrate different predetermined slits 2 of scale 1. The screens or shutters of each group are adapted to be individually and alternately placed in the path of the light rays so that different combinations of shutters of different groups may be brought into joint action. The said passageways for the light rays correspond in the shutters of one group to a unit of the scale graduation (for example to a millimeter), in the second group to a multiple thereof (for example ten millimeters) and in following groups, if any, to still greater multiples thereof (for example hundred millimeters, thousand millimeters, and so on). The shutters of each group are preferably mounted upon common supports which will permit to place the shutters alternately in operating position.

In the embodiment shown in FIGS. 1 and 2 which includes a decimal scale 1 using a millimeter as a graduation unit two groups 18, 19 of shutters are used and each gorup comprises ten shutters 18(0), 18(1), 18(2) . . . 18(9) and 19(0), 19(1), 19(2) . . . 19(9), respectively. The shutters of each group are radially and in equally spaced relation mounted upon a rotary body or drum 18′, 19′ respectively, rotatably seated in frame 5. By turning said drums each shutter of each group may be placed into the path of the light rays 12 permitting to combine each shutter of one group for cooperation with each shutter of the other group, and allowing the light rays to pass through the passageways of every combination related to a certain graduation slit 2 of the scale 1.

The shutters of the group 18 are in succession provided with passageways 18″ corresponding to following graduation slits 2 of scale 1. Thus the passageways 18″ in shutter 18(0) correspond with graduation slits 2 indicating the scale measures 0, 10, 20 etc. up to 90, the passageways 18″ in shutter 18(1) correspond with graduation slits 2 indicating the scale measures 1, 11, 21, etc. up to 91, and so on up to shutter 18(9) wherein the passageways 18″ correspond with graduation slits 2 indicating the scale measures 9, 19, 29 etc. up to 99. The said passageways 18″ are preferably slightly wider than the graduation slits 2.

The shutters of the group 19 are in succession provided with passageways 19″ having a width of ten measuring units. Thus the passageway 19″ in shutter 19(0) corresponds to the first decade of graduation slits 2 including the scale measures 0 to 9, the passageway 19″ in shutter 19(1) corresponds to the second decade of graduation slits 2 including the scale measures 10 to 19, and so on up to shutter 19(9) wherein the passageway 19″ corresponds to the tenth decade of graduation slits 2 including the scale measures 90 to 99 of the scale 1.

It will be well understood that each combination of a shutter of group 18 with a shutter of group 19 will predetermine a certain graduation slit 2 to be penetrated by light rays 12. For example as shown in the drawing the shutter 18(0) and the shutter 19(2) are placed in the path of the light rays 12. When the carriage 8 with the illuminating device 9 is being displaced in axial direction of the drums 18′, 19′ the light rays 12 will be able to pass through all passageways in shutter 18(0) but only through the passageway 19″ of shutter 19(2) corresponding to the third decade of graduation slits 2 including the scale measures 20 to 29. Thus the shutters 18(0) and 19(2) in operational position will allow a predetermined passage of the light rays through the graduation slit 2 indicating the measure "20" upon scale 1. In the same manner by placing other shutters in operative position the passage of light rays through any graduation slit 2 indicating scale measures from 0 up to 99 may be predetermined.

It will be further well understood that the number of drums supporting groups of shutters may be increased for example to three drums to predetermine graduation slits in scales including 999 measuring units, or to four in combination with scales including 9999 measuring units, etc.; in this case the width of the passageways in shutters of each following group is a multiple for example a decouple of the width of passageways in the shutters of the preceding group. In case that the said pencil of parallel rays 12 does not produce sufficiently accurate projection of the said passageways upon the graduation slits 2 of scale 1 it may be advisable to install intermediate projecting systems between the said drums; said systems will be mounted upon the carriage 8.

Each of the drums 18′, 19′ may be adjusted in the desired positions by a ten-tooth setting wheel 22, 26, respectively, provided with an indicator rim 23, 27, showing the numbers 0 to 9. The said wheels 22, 26 turn over ten-tooth gears 20, 21 and 24, 25 the said drums 18′, 19′ into the desired position. Each number of the setting wheels indicates a corresponding position of said drums. If wheel 22 is turned in any position indicated by either of the numerals 0 to 9 then the drum 18′ will be turned accordingly bringing the respective shutter of group 18 into the path of the light rays 12. If, as shown, the setting wheel 22 is positioned accordingly to the indicator number 0 then the shutter 18(0) will be placed in active position. This shutter 18(0) contains as stated above, the passageways related to the graduation slits 2 indicating the scale graduations 0, 10, 20, 30, etc. up to 90, and will permit the passage of light rays tending to reach such scale graduations. By successively turning the drum by 36° the next shutters 18(1) to 18(9) may be brought in active position these shutters containing passageways related to graduation slits 1, 11, 21 . . . to 91; 2, 12, 22 . . . to 92; and so on up to 9, 19, 29 . . . to 99, respectively.

The drum 19 is similarly actuated by the setting wheel 26 and the intermediate gearing 24, 25, the numbers of indicator rim indicating decades as in calculating machines, 0 standing for 0 to 9, 1 for 10 to 19, etc. Thus any corresponding combination of shutters of groups 18 and 19 may be predeterminatively set.

The position of the drums 18′, 19′ may be secured, in a manner customary in calculating machines, by spring notches engaging for example the ten-tooth gears 20 and 24.

The embodiment illustrated in FIGS. 3 and 4 differs from the previously described embodiment therein that the shutters of one group namely the shutters mounted upon drum 18′ are themselves adapted to serve as precision measuring means. The basic arrangement of this second embodiment is substantially the same as that of the embodiment illustrated in FIGS. 1 and 2 and therefore it is shown in still more simplified manner the same reference characters indicating the same or equivalent parts. This embodiment again includes an illuminating device 9 and a photoelectric control device 13 both mounted on a carriage 8, not shown. The illuminating device 9 comprises an electric light source 10 and a condenser lens 11 directing a pencil of parallel light rays 12 towards the said photoelectric measuring device 13 fully described with reference to FIGS. 1 and 2. The drum 18′ bears ten shutters 18(0), 18(1), 18(2) up to 18(9) in which passageways 18″ representing on graduation unit are provided with greatest possible precision. These passageways substitute for the graduation slits 2 of scale 1 shown in FIGS. 1 and 2. By successively turning the drum 18′ by 36° slits corresponding to consecutive graduation marks are brought into the path of the light rays 12 and are projected upon the photoelectric control device 13 by means of the objective 60 which is also mounted upon carriage 8.

The selection of one of the passageways 18″ contained in one shutter of group 18 is effected, like in the embodiment illustrated in FIGS. 1 and 2, by a group 19 of ten shutters 19(0) up to 19(9) in which the passageways 19″ have the width of ten measuring units. The positioning of the drums 18′, 19′ is effected by numeral wheels 22, 26, respectively, which by proper gearing turn the drums 18′, 19′.

Scales of greater length have in general a graduation using one millimeter or 1/16 of an inch as a unit. A further subdivision, if required for more precise measurement, is usually being performed by displacing, by means of a spindle and nut, a reference cross scale or the measuring head of a control device relative to an enlarged projection of the measuring unit, this displacement being read upon a measuring drum. Such known devices may be used in combination with my new instrument and may prove to be sufficiently exact.

However, these devices have the disadvantage that passing over one or several measuring units, for example from 0,999 to 1,001, can be achieved only by the use of complicated mechanical means which are not too reliable and are not easy to operate.

To avoid these disadvantages I use according to my invention optical means to subdivide the unit graduation of the scale. These means, as illustrated in FIGS. 5 and 6, consist of a plurality of adjustable plane parallel glass plates which are selectively placed into the path of the light rays and refractively displace the same by predetermined fractions of the measuring unit. As shown an adjustable support such as a rotatably mounted cylindrical body 35 is provided with a plurality for example ten windowlike openings which selectively may be placed in the path of the light rays 12 after the same have passed a certain graduation slit 2 of the scale 1 and an objective 53. One of said windowlike openings marked 46 is empty whereas each of the remaining openings houses a frame member 37 to 45, respectively, containing a plane parallel glass plate. Each of said frame members 37 to 45 within its respective windowlike opening is rotatably mounted about an axis which is, at least in the active position of the plane parallel glass plate, perpendicular to the optical axis of the system and parallel to the edges of the measuring or graduation slits 2 of the precision scale 1.

The thickness of each glass plate is so selected and its position rotatively so adjusted that the light rays 12 passing therethrough are refractively displaced by a certain fraction of the measuring or graduation unit such as one millimeter of scale 1. In the shown embodiment wherein nine glass plates are used the different glass plates will refractively displace the light rays 12 by 1/10, 2/10, 3/10 etc. up to 9/10 mm., respectively. The glass plate 47 in frame 38 being by way of example shown inserted into the path of light rays 12 will displace the light rays 12 by 8/10 of the millimeter unit of the scale 1. The thickness of said glass plate 47 is so selected that the desired displacement of the light rays 12 is effected in its shown position inclined by 45°. The frame 38 being rotatable about axis 48 may be adjusted in any position by means of the adjusting screw 49 and held in such position by suitable securing means not shown in the drawing. Apart from their different thickness and their adjusted positions all frame members 37 to 45 with their respective glass plate are constructed alike. The required exact position of each glass plate will be determined by optical measurement of the refractive displacement of the image of the respective measuring or graduation slit 2.

The photoelectric control device 13, the objective 53 and the illuminating device 9 are again mounted on a carriage 8 as illustrated in FIG. 1 but not shown in FIG. 5, which is displaceable parallel to the precision scale 1. If the support 35 is so positioned that the empty window 46 lies in the path of the light rays 12 both photo cells 16, 17 will receive the same amount of light over the prisms 16, 17 and the control device 13 will remain at rest. However, if any of the plane parallel glass plates held in the frame members 37—45 for example as shown the glass plate 47 held in frame member 38 is inserted into the path of the light rays 12 then these light rays will be accordingly parallel displaced by a certain fraction of the graduation unit, namely by plate 47 by 8/10 mm., so that the photoelectric cell 17 receives more light than cell 16. Thus the control device 13 will be electrically actuated and the carriage 8 will be so long displaced until both photoelectric cells 16, 17 will again receive the same amount of light and will stop any further displacement of said carriage.

Support 35 is rigidly connected with a ten-tooth gear 58 which in a manner customary in calculating machines meshes with a number gear 59. The numbers of this gear correspond to the magnitude of the traverse of carriage 8 effected by the control device 13. The position of the gear 58 may be secured by any suitable means for example by a spring notch (not shown). It will be well understood that a plurality of supports 35 as described above may be arranged axially one behind the other if finer subdivisions are required, such additional supports 35 including glass plates adapted to displace the light rays by a smaller fraction of the graduation unit, for example 1/100, 1/1000 more or less.

By including the device shown in FIGS. 5 and 6 into the apparatus shown in FIGS. 1, 2 and 3, 4, respectively, precision scales of any desired length and of any graduation may be used. According to my invention it is also possible to combine means for the release and/or displacement of image and/or illuminating light rays of several places or digits (for example of the decimal system) upon a rotational body such as a cylinder, in which case the rotational displacement of said rotational body for release or displacement of the next division becomes correspondingly smaller. The adjustment in the respective digits of the numerical system will then be effected over correspondingly divided intermediate gears, if necessary by using clutches for the single digits.

Whereas FIGS. 1, 2 and 3, 4, respectively, show only two groups 18 and 19 of shutters, it will be well understood that additional groups may be included, the passageways in each group having a width ten times greater than that of the preceding group. FIG. 8 illustrates schematically the application of three groups of shutters, only the first two shutters of each group being indicated. The first group 18 comprises the shutters 18(0) to 18(9) and the second group 19 the shutters 19(0) to 19(9) as described above with reference to FIGS. 1, 2 and 3, 4, respectively. Each passageway in shutters of group 18 corresponds to one single graduation slit 2 and thus the passageways in shutter 18(0) correspond with graduation slits indicating the measuring units, 0, 10, 20, 30 and so on; the passageways in shutter 18(1) with graduation slits indicating the measuring units 1, 11, 21, 31 and so on; and finally the passageways in shutter 18(9) with graduation slits indicating the measuring units 9, 19, 29, 39 and so on. In group 19 the passageways in succeeding shutters 19(0) to 19(9) corresponds to decades of graduation slits namely 0–9, 100–109, 200–209 and so on in shutter 19(0); 10–19, 110–119, 210–219 and so on in shutter 19(1); and finally to 90–99, 190–199, 290–299 and so on in shutter 19(9). In the third group 60 the passageways in the shutters correspond to one hundred graduation slits namely 0–99, 1000–1099 and so on in shutter 60(0); 100–199, 1100–1199 and so on in shutter 60(1); and finally 900–999, 1900–1999 and so on in shutter 90(9).

It will be finally understood that in my new apparatus several scales of different graduations may be used and that the shown arrangement using a stationary scale and a movable system including illuminating device, objective and photoelectric control device may be reversed.

While specific embodiments of my invention have been shown and described in detail to illustrate the application of the principles of my invention it will be well comprehended that the same may be otherwise embodied without departing from such principles.

What I claim as my invention is:

1. In an optical positioning, adjusting, or measuring apparatus for machines or measuring appliances the improvement comprising in combination a weblike precision scale having a series of regularly spaced light permeable slits separated by opaque portions; each slit conforming to a graduation unit of the scale; a light source and a photoelectric control device mounted, respectively, on opposite sides of said scale for displacement longitudinally thereto and relative to each other; optical means in front of said light source adapted to guide a pencil of parallel light rays through said slits of the scale upon said photoelectric control device, a first group and a second group of shutters; each shutter having substantially the length of said scale; a support for each group of shutters adapted to hold each shutter in a light rays intercepting position between said optical means and said scale; passageways for said light rays in each shutter; the passageways in the shutters of the first group substantially confroming to the graduation unit of the scale and being displaced by one graduation unit from shutter to shutter, so that each shutter contains the same series of passageways displaced by one graduation unit; the passageways in the shutters of the second group having the width of so many graduation units as are shutters in the first group and said passageways being displaced in individual shutters to follow each other in longitudinal direction of the shutter and the scale, respectively; thus any combination of a shutter of one group with any shutter of the other group will clear the way for the light rays through a predetermined graduation slit of the scale to the photoelectric control device to actuate the same.

2. In an optical positioning, adjusting, or measuring apparatus for machines or measuring appliances the improvement according to claim 1, comprising at least one additional group of shutters each such additional group including passageways having a width equal to the width of a plurality of passageways in the preceding group.

3. In an optical positioning, adjusting, or measuring apparatus for machines or measuring appliances the improvement according to claim 1, wherein the support for each group of shutters consists of a drumlike member rotatably adjustable upon an axis parallel to the scale, the shutters being mounted thereupon in substantially radial and substantially equally spaced positions.

4. In an optical positioning, adjusting, or measuring apparatus for machines or measuring appliances the improvement comprising in combination, a light source; a photoelectric control device responsive to said light source; optical means in front of said light source adapted to guide a pencil of parallel light rays to said control devices; a first and at least one additional group of shutters; a support for each group of shutters adapted to place each shutter in a light rays intercepting position between said light source and said control device; the light source together with said control device and said shutters being in longitudinal direction thereof displaceable relative to each other; passageways for said light rays in each shutter; the passageways in the shutters of the first group forming measuring graduation units and being displaced by one graduation unit from shutter to shutter, so that each shutter contains the same series of passageways displaced by one graduation unit; the passageways in the shutters of each additional group having a width equal to the width of a plurality of passageways in the preceding group; and being displaced in individual shutters to follow each other in longitudinal direction thereof; thus any combination of one shutter of one group with any shutter of any additional group clearing the way for light rays in a predetermined position to actuate the photoelectric control device.

5. In an optical positioning, adjusting, or measuring apparatus for machines or measuring appliances the improvement comprising in combination a weblike precision scale having a series of regularly spaced light permeable slits separated by opaque portions; each slit conforming to a graduation unit of the scale; a light source mounted in front of one side of said scale for displacement longitudinally thereto; optical means between said scale and said light source adapted to guide a pencil of parallel light rays through said slits of the scale; a first group and at least one additional group of shutters; each shutter having substantially the length of said scale; a support for each group of shutters adapted to hold each shutter in a light rays intercepting position between said optical means and said scale; passageways for said light rays in each shutter; the passageways in the shutters of the first group substantially conforming to the graduation unit of the scale and being displaced by one graduation unit from shutter to shutter, so that each shutter contains the same series of passageways displaced by one graduation unit; the passageways in the shutters of each additional group having the width of so many graduation units as are shutters in the preceding group and said passageways being displaced in individual shutters to follow each other in longitudinal direction of the shutter and the scale, respectively; thus any combination of a shutter of one group with any shutter of the other group will clear the way for the light rays through a predetermined graduation slit of the scale so that the light rays penetrating said predetermined graduation slit may be detected and the positioning, adjusting or measuring apparatus actuated in a predetermined position.

6. In an optical positioning, adjusting or measuring apparatus for machines or measuring appliances the improvement according to claim 5, comprising at least one additional group of shutters each such additional group including passageways having a width equal to the width of a plurality of passageways in the preceding group.

7. In an optical positioning, adjusting or measuring apparatus for machines or measuring appliances the improvement according to claim 5, wherein the support for each group of shutters consists of a drumlike member rotatably adjustable upon an axis parallel to the scale, the shutters being mounted thereupon in substantially radial and substantially equally spaced positions.

References Cited in the file of this patent

UNITED STATES PATENTS

| 1,081,031 | Eppenstein | Dec. 9, 1913 |
| 1,794,341 | Parkhurst | Feb. 24, 1931 |
| 1,818,410 | Leventhal | Aug. 11, 1931 |
| 2,057,495 | Long | Oct. 13, 1936 |
| 2,311,142 | Turrettini | Feb. 16, 1943 |
| 2,375,665 | Koulicovitch | May 8, 1945 |
| 2,406,299 | Koulicovitch | Aug. 20, 1946 |
| 2,557,219 | Flint et al. | June 19, 1951 |
| 2,659,828 | Elliott | Nov. 17, 1953 |
| 2,669,900 | Cherry | Feb. 23, 1954 |
| 2,694,804 | Wagner | Nov. 16, 1954 |